United States Patent [19]
Wright et al.

[11] Patent Number: 5,644,093
[45] Date of Patent: Jul. 1, 1997

[54] SENSOR MOUNTING PAD AND METHOD

[75] Inventors: David W. Wright, Novi; John M. Adams, Manchester; Martha J. Rumford, Ann Arbor, all of Mich.

[73] Assignee: Minnesota Mining and Manufacturing Company, St. Paul, Minn.

[21] Appl. No.: 707,656

[22] Filed: Sep. 12, 1996

Related U.S. Application Data

[63] Continuation of Ser. No. 420,011, Apr. 11, 1995, abandoned.
[51] Int. Cl.$^6$ .................................................. A47F 7/02
[52] U.S. Cl. .................................. 73/866.5; 248/205.3
[58] Field of Search ................................ 73/644, 866.5, 73/290 V, 304 C; 248/205.3; 604/404, 407, 251

[56] References Cited

U.S. PATENT DOCUMENTS

| | | | |
|---|---|---|---|
| 3,476,257 | 11/1969 | O'Connell | 211/13 |
| 4,193,004 | 3/1980 | Lobdell et al. | 250/577 |
| 4,715,398 | 12/1987 | Shouldice et al. | 137/171 |
| 4,744,808 | 5/1988 | Treu | 55/165 |
| 4,840,337 | 6/1989 | Zaugg | 248/115 |
| 4,984,462 | 1/1991 | Hass, Jr. et al. | 73/293 |
| 5,110,077 | 5/1992 | Mossini | 248/205.3 |
| 5,178,354 | 1/1993 | Engvall | 248/316.7 |
| 5,275,367 | 1/1994 | Frye | 248/205.3 |
| 5,282,783 | 2/1994 | Lindsay | 604/4 |
| 5,394,732 | 3/1995 | Johnson et al. | 73/19.1 |

OTHER PUBLICATIONS

Cobe Manual: Air Emboli Protection; pp. 26–29 (1984).
"Operation: Low Level Detector"; pp. 7–8, Shiley; (1984).
"Product Description: Low Level Detector"; pp. 4–6, Shiley (1984).
"COBE Personalized Perfusion Products Versaplegia™ 4:1"; COBE Laboratories, Inc., Lakewood, CO (1989).
Specifications, Computerized Perfusion Controller, Precision Blood Pump, Cardiolinc, Air Emboli Protection System, Chronotherm, Gas Flowmeter; Cobe Laboratories, Inc., Lakewood, CO (1988).
"COBE Personalized Perfusion Products Bracketry System"; Cobe Laboratories, Inc. (1990).
Flyer, "Computerized Perfusion Controller Enhancements Improved Level Sensor Holder"; Cobe Laboratories, Inc., Lakewood, CO (Oct., 1989).
COBE Membrane Lung EXCEL: Instructions for Use; Cobe Laboratories, Inc., Lakewood, CO (Date unknown).
"JOSTRA HL20: User's manual"; JOSTRA AB, Lund, Sweden (1994).
"Using the Safety Monitor, Level Detection"; pp. 4.8–4.11; Sarns, Inc/3M (1993).
"COBE Air Emboli Protection System (include. level sensor disposable plates): Instructions for Use"; COBE Cardiovascular, Inc., Arvada, CO (1991).
Operators Manual, "Sarns® Photocell Sensor Assemblies" (3M), dated 1989.
Technical Support Manual, "MDX" Access Equipment, vol. 1, pp. 4–8 (1989).

(List continued on next page.)

*Primary Examiner*—Robert Raevis
*Attorney, Agent, or Firm*—Gary L. Griswold; Walter N. Kirn; Stephen W. Bauer

[57] ABSTRACT

A mounting pad for mounting a sensor transducer, such as an ultrasonic level sensor, on a fluid reservoir, such as a blood reservoir. The mounting pad comprises a bayonet-type locking mechanism for mounting the transducer on the mounting pad, and a pair of foot pads connected to the body of the mounting pad by living hinges. The living hinges are provided along an outer surface of the foot pads at a location intermediate the edges of the foot pads, such that the foot pads can pivot relative to the body to conform to the configuration of the reservoir and such that any forces applied to the foot pads via the body of the mounting pad are applied intermediate the edges of the foot pads, as opposed to directly along the edges.

36 Claims, 4 Drawing Sheets

OTHER PUBLICATIONS

Five photographs of the "SARNS™" Level Sensor Pad (3M Part No. 16432901) (photo taken Jun. 1995).

Three photographs of Shiley, Inc.'s mounting pad (Product Designation: 23-22-08) (photo taken Jun. 1995).

Four photographs of the "Catalog No. 043-220-350 Level Sensor Disposable Plate" from Cobe Cardiovascular, Inc. (photo taken Jun. 1995).

Drawings of the "SARNS™" photocell suction cup.

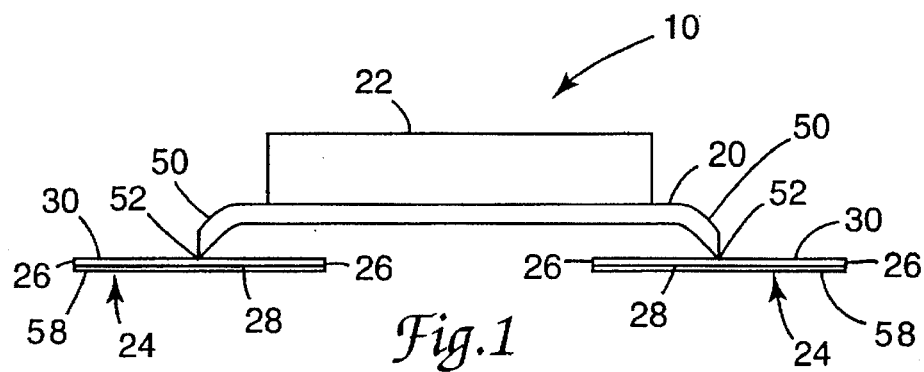
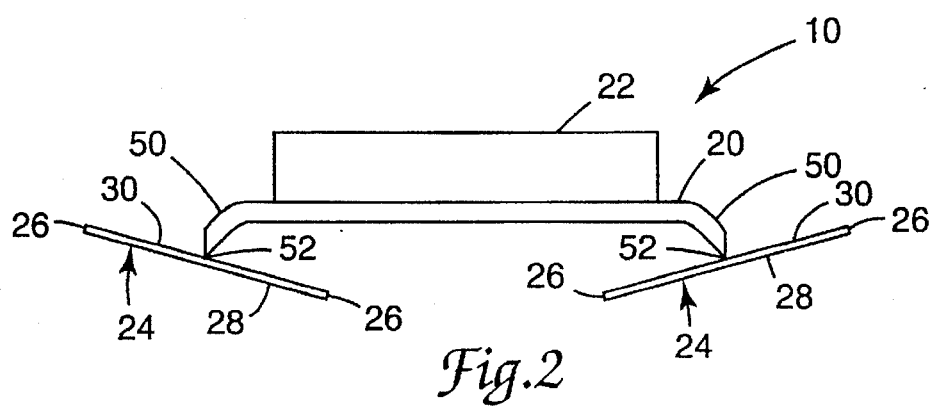
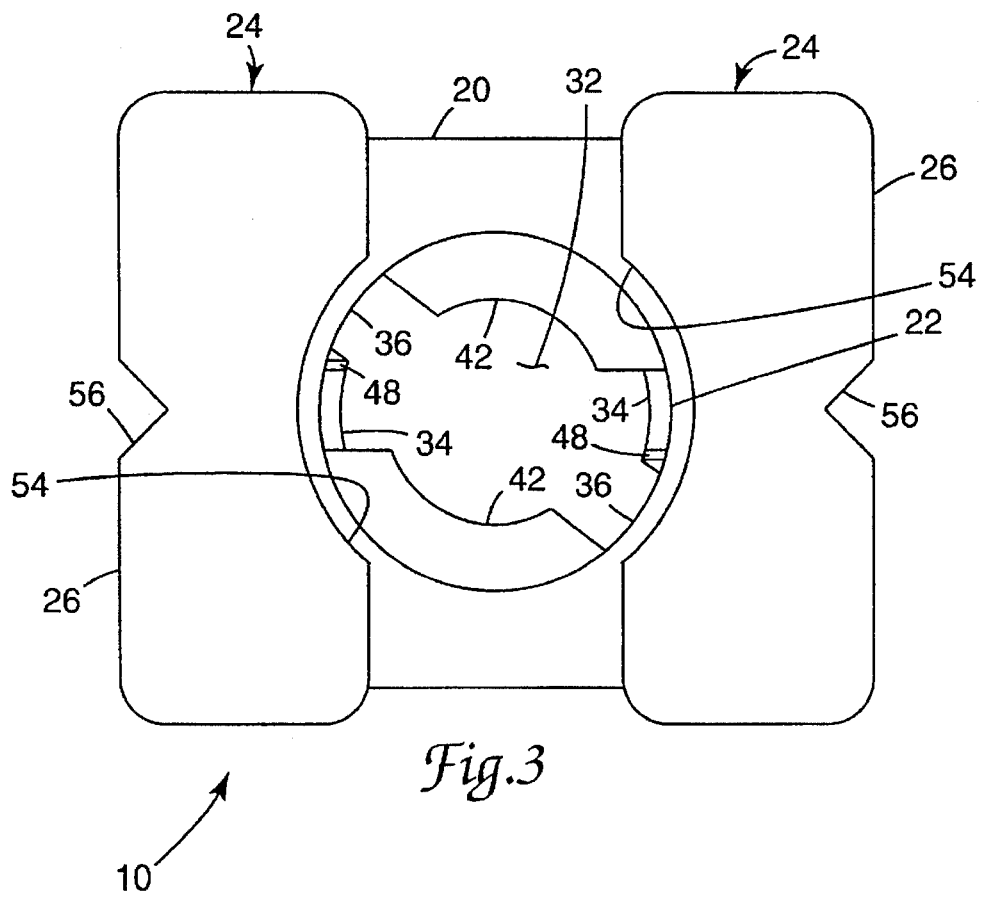

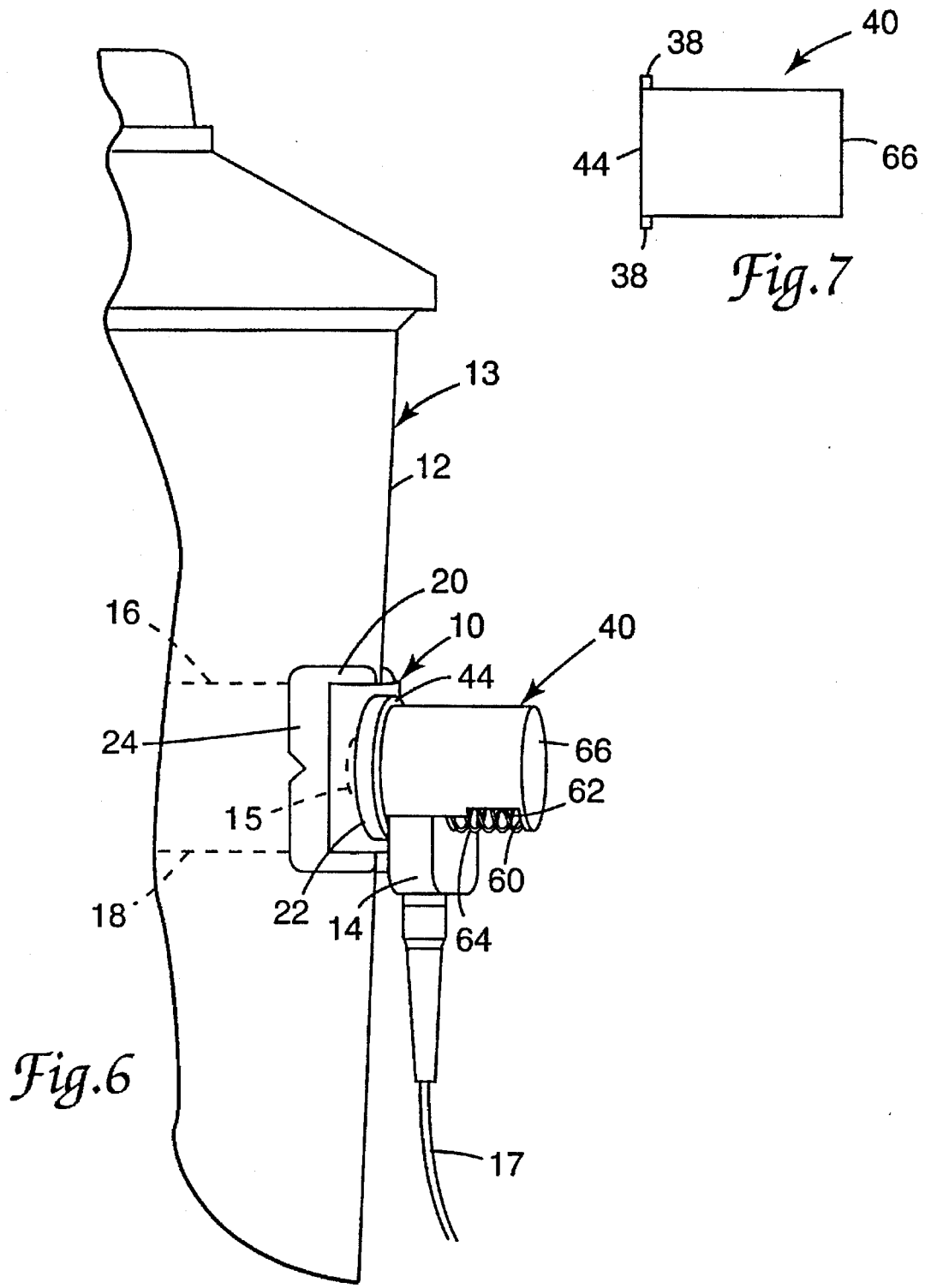

SENSOR MOUNTING PAD AND METHOD

This is a continuation of application Ser. No. 08/420,011 filed Apr. 11, 1995, now abandoned.

This invention relates generally to a mounting pad for a sensor, and more particularly to a mounting pad for mounting a sensor transducer, such as a fluid level sensor transducer, on a wall, for example, the housing wall of a blood reservoir used in an extracorporeal circulatory support circuit.

BACKGROUND OF THE INVENTION

It is common to mount one or more fluid level sensors on rigid blood reservoirs to trigger warnings (alerts or alarms) when the fluid level in the reservoir exceeds or drops below various levels. An "alert" is an audible and/or visible warning to the perfusionist or other medical practitioner that, for example, the liquid level in the reservoir has dropped below a specified level, with the perfusionist or other medical practitioner manually taking any desired or necessary steps in response. An "alarm" is an audible and/or visible warning plus an automatic response by the equipment, for example, stopping a perfusion pump. One preferred technique is to provide an "alert" for a first low level of liquid, and an "alarm" when the liquid drops below a second, even lower level.

Examples of ultrasonic blood level sensor have been available under the trade designations "SARNS™ 8K™" and "SARNS™ 9K™" level sensors from Minnesota Mining and Manufacturing Company, St. Paul, Minn.; "JOSTRA HL20" level sensor from Jostra AB, Lund, Sweden; "COBE/CPC™ SYSTEM" level sensor from Cobe Laboratories, Inc., Lakewood, Colo.; and "STOCKERT-SHILEY CAPS™" and "STOCKERT LEVEL DETECTOR II" from Sorin Biomedica SpA, Saluggia, Italy, or Sorin Biomedical Inc., Irvine, Calif. Other sensors may also be mounted on the walls of such reservoirs, for example, blood gas sensors.

Typically, rigid blood reservoirs have housing walls formed of transparent and ultrasonic-compatible material, such as polycarbonate. Frequently, the reservoirs have generally round cross sections or other non-flat wall sections. Examples of such rigid blood reservoirs have been available from Minnesota Mining and Manufacturing Company, St. Paul, Minn., under the trade designations "SARNS™" venous reservoir and "SARNS™" integral venous/cardiotomy reservoir. Rigid blood reservoirs are disclosed, for example, in co-assigned U.S. Pat. Nos. 5,149,318; 5,152,964; 5,254,080; 5,282,783; 5,304,164; and 5,403,277, and co-assigned U.S. patent application Ser. No. 08/142,809, filed Oct. 25, 1993.

One prior level sensor mounting pad has been available under the trade designation "SARNS™ Level Sensor Pads (Part No. 16432901)" from Minnesota Mining and Manufacturing Company, St. Paul, Minn. Those pads were packaged in pairs, to facilitate use with "alert" and "alarm" sensors, along with a conventional gel which is placed between the sensor and the housing wall of the reservoir. That pad was relatively rigid and included a bayonet-type mounting ledge for receiving bayonet-type locking tabs along the outer side of the pad, and an adhesive-coated foam tape along the inner side of the pad. As used herein, "outer side" refers to the side of the pad that faces away from the reservoir in use of the pad, and "inner side" refers to the side of the pad that faces and is affixed to the reservoir. The inner side of the pad included a concavely curved inner portion extending between the upper and lower edges of the pad along an intermediate portion of the pad that was designed to conform to the round cross section of a reservoir, and flat end portions extending between the upper and lower edges of the pad along the side edges of the pad in order to conform to flat walled reservoirs. That pad further had an opening through the pad to allow the transducer lens of an ultrasonic transducer to obtain an operational relationship with the reservoir, e.g., to contact the wall of the reservoir. Except for the foam tape, that pad was integrally molded in one continuous piece of the polycarbonate material available under the trade designation "MERLON™ No. 2608" from Mobay Chemical Corporation, Pittsburgh, Pa.

Another mounting pad has been available under the trade designation "Mounting Pad (Product Designation: 23-22-08)" from Shiley, Inc., Irvine, Calif., (now Sorin Biomedical Inc.). That mounting pad includes an adhesive for holding the mounting pad on the housing wall of the reservoir.

Other mounting pads have been available under the trade designation "Catalog No. 043-220-350 Level Sensor Disposable Plate" from Cobe Cardiovascular, Inc., Arvada, Colo., and the trade designation "Catalog No. 043220-300 Attachment Plate" from Cobe Laboratories, Inc., Lakewood, Colo. Those mounting pads each include an adhesive for holding the mounting pad on the housing wall of the reservoir.

One problem with many prior mounting pads is failure of the mounting pad to remain fixed to the reservoir wall during use. The result frequently is the generation of false alerts and alarms.

Typically, ultrasonic transducers are spring-loaded against the housing wall of the reservoir, with the transducer applying an equal outwardly-directed force to the mounting pad holding the transducer on the reservoir. Such outwardly-directed forces tend to lead to creep of the adhesive, leading in some cases to separation of the mounting pad from the reservoir. Over time the mounting pad "peels" from the edge of the adhesive area, which is where force tends to be concentrated in the prior designs. One response is for the perfusionist to attempt to stick the mounting pad back on the reservoir, which may work for awhile anyway. Other forces tending to separate mounting pads from reservoir walls include the weight of the transducer/sensor cable, and jostling of the transducers and cables during use.

An infra-red blood level sensor has been available under the trade designation "SARNS™ 7000™" level sensor. That level sensor was mounted with a suction-type mount.

SUMMARY OF THE INVENTION

This invention provides a mounting pad for mounting a sensor on a reservoir, and that is adapted to conform to the configuration of a rigid housing wall, for example, a housing having either a generally rectangular or round horizontal cross section. The mounting pad is designed to aggressively grip the housing wall in order to prevent the mounting pad from inadvertently being separated from the housing wall. The mounting pad of the invention is designed to be inexpensive, easy-to-use, reliable and disposable.

Generally, the mounting pad of the invention comprises a body, means on the body for mounting a sensor on the body of the mount, and at least two foot pads. Each foot pad has edges, a mounting surface having an adhesive coating, and an outer surface opposite the mounting surface. The outer surface is pivotably connected to the body intermediate the edges of the foot pad such that (a) the foot pads can pivot relative to the body to conform to the configuration of the reservoir, and (b) any forces applied to the foot pads via the body of the mounting pad are applied intermediate the edges of the foot pads.

In a second aspect of the invention, a mechanism is provided comprising the mounting pad and a locking member. The locking member has a first end, and an internal cavity for receiving an ultrasonic transducer of an ultrasonic level sensor, with an open end through the first end of the locking member. A spring is provided within the locking member for biasing the transducer in the direction toward the first end. Outwardly extending locking tabs are provided adjacent the first end of the locking member. A bayonet locking connector and a through opening are provided in the mounting pad. The bayonet locking connector has ledges for locking the locking tabs of the locking member on the body of the mounting pad with the open end of the internal cavity of the locking member aligned with the opening through the body, whereby a transducer lens of the ultrasonic transducer received in the cavity of the locking member can also be received through the opening in the body of the mounting pad.

In a third aspect of the invention, a method of mounting an ultrasonic level sensor on a blood reservoir is provided. The method of the invention generally comprises the following steps:

(a) removing a release liner from the foot pads of the mounting pad to expose the adhesive coating;

(b) pressing the foot pads against a housing of the reservoir while allowing the foot pads to pivot relative to the body to conform to the configuration of the housing of the reservoir;

(c) pressing the locking member against the bayonet locking connector of the mounting pad and (d) twisting the locking member to engage the locking tabs of the locking member in the bayonet locking connector of the mount, thereby bringing a transducer lens of the ultrasonic transducer through the opening in the body of the mounting pad and into operative relationship with the reservoir; and (e) applying forces to the body of the mount, with said forces being transmitted to the foot pads intermediate the edges of the foot pads rather than directly to an edge of the foot pads.

Further details of the invention are defined in the features of the claims. These and other advantages and features will be pointed out hereinafter.

BRIEF DESCRIPTION OF THE DRAWING

The invention will be further described with reference to the drawing wherein corresponding reference characters indicate corresponding pads throughout the several views of the drawing, and wherein:

FIG. 1 is a side elevational view of the mounting pad of the invention, illustrating either the top or bottom of the mounting pad as the mounting pad would be used a blood reservoir;

FIG. 2 is a side elevational view of the mounting pad of FIG. 1, illustrating two foot pads of the mounting pad being pivoted along living hinges relative to the body of the mounting pad;

FIG. 3 is a bottom plan view of the mounting pad of FIGS. 1 and 2, showing the "inner" side of the mounting pad;

FIG. 6 is a perspective view of the mounting pad of the invention mounted on the housing wall of a blood reservoir of the type used for cardiopulmonary support during cardiovascular surgery, with a locking member and ultrasonic transducer mounted on the mounting pad;

FIG. 7 is a side elevational view of a locking member of FIG. 6, showing bayonet-type locking tabs extending outwardly from the locking member.

DETAILED DESCRIPTION OF A PREFERRED EMBODIMENT

Figure 4:
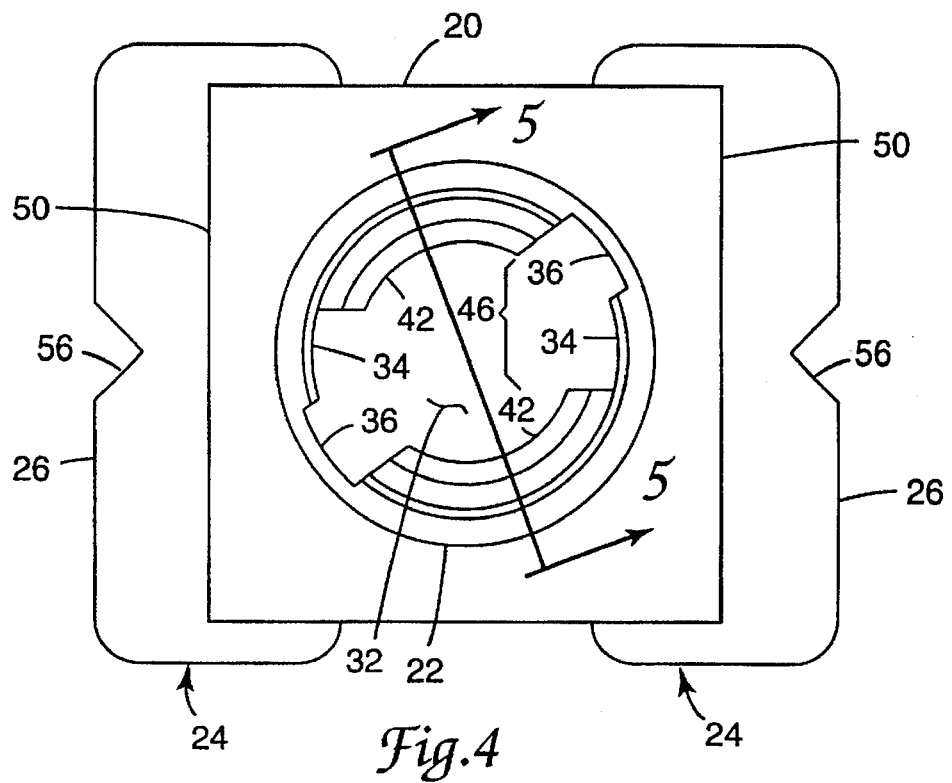
FIG. 4 is a top plan view of the mounting pad of FIGS. 1–3, showing the "outer" side of the mounting pad.
Figure 5:
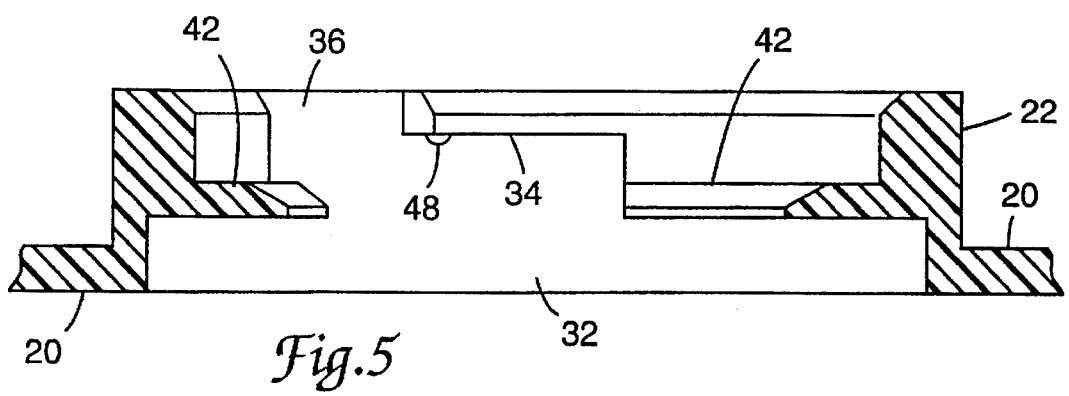
FIG. 5 is a cross-sectional view substantially along line 5—5 of FIG. 4.

Now referring to the drawing, a mounting pad of the invention is indicated in its entirety by the reference numeral 10. The mounting pad 10 is particularly adapted to be adhesively mounted on the generally arcuate side housing wall 12 of a reservoir 13, as illustrated in FIG. 6. The reservoir 13, for example, is a venous blood reservoir or integral venous/cardiotomy blood reservoir that is part of an extracorporeal circulatory support circuit. The wall 12 of the reservoir 13 defines a chamber for holding venous blood drained from the patient's venous system and/or scavenged from the surgical field during heart bypass surgery. The wall 12 is typically formed of generally transparent, ultrasonic-compatible material, such as polycarbonate, and may have a generally round or rectangular horizontal cross section. Such circuits typically include the reservoir 13, a blood pump (for example, a peristaltic roller pump or centrifugal pump), a blood oxygenator and heat exchanger. Examples of such circuits are disclosed in co-assigned U.S. Pat. No. 5,282,783 and co-assigned U.S. patent application Ser. No. 08/142,809, filed Oct. 25, 1993, which are hereby incorporated herein by reference.

As illustrated in FIG. 6, the mounting pad 10 holds an ultrasonic transducer 14 of a level sensor in operative relationship with the reservoir 13 to, for example, detect whether the level 16 or 18 of fluid, e.g., blood, is above or below the transducer 14, respectively. Suitable ultrasonic level sensors are available under the trade designations "SARNS™ 8K™" and "SARNS™ 9K™" level sensors from Minnesota Mining and Manufacturing Company, St. Paul, Minn. The ultrasonic transducer 14 includes a transducer lens 15 (shown in phantom in FIG. 6) that is brought into contact with the housing wall 12 of the reservoir 13, conventionally, after a gel has been provided between the transducer lens 15 and the wall 12 of the reservoir 13. A cable 17 connects the ultrasonic transducer 14 with additional apparatus for generating an alert or alarm, and if an alarm is generated, stopping the perfusion pump. When the liquid level drops below the level of the ultrasonic transducer 14, an optical and acoustic alarm is generated and the blood pump (not shown) of the support circuit is stopped. The mounting pad 10 may also be used to hold other types of sensors, for example, optical blood gas sensors, bubble detectors, or any other sensor that is held adjacent or against a wall.

The mounting pad 10 generally comprises a body 20, means 22 on the body 20 for mounting a sensor transducer 14 on the body 20 of the mounting pad 10, and at least two novel foot pads 24. Each foot pad 24 has edges 26, a mounting surface 28 having an adhesive coating (also 28), and an outer surface 30 opposite the mounting surface 28. As used herein, the term "inner" refers to the direction facing the reservoir wall 12 in use of the mounting pad 10, and the term "outer" refers to the direction facing away from the reservoir wall 12 in use of the mounting pad 10. The "outer" direction is the direction extending upwardly in FIGS. 1 and 2, and the "inner" direction is the direction extending downwardly in FIGS. 1 and 2.

The outer surface 30 of each foot pad 24 is pivotably connected to the body 20 intermediate the edges 26 of the foot pad 24 such that (a) the foot pads 24 can pivot relative to the body 20 to conform to the configuration of the reservoir (e.g., generally round or rectangular horizontal cross section), and (b) any forces applied to the foot pads 24 via the body 20 of the mounting pad 10 are applied intermediate the edges 26 of the foot pads 24. This is in sharp contrast to the prior mounting pads, which involve forces applied directly along the edges of their adhesive areas, commonly leading to adhesive creep and release of such mounting pads from the reservoir wall. As used herein, the term "intermediate" refers to the feature of the living hinges 52 pivotably connecting the foot pads 24, to the body 20 being spaced from any edge 26 of the foot pads 24 so that any force applied to the foot pads 24 via the living hinges 52 is applied "intermediate" the edges 26 of the foot pads 24.

The means 22 on the body 20 for mounting a sensor 14 on the body 20 of the mounting pad 10 preferably comprises a bayonet-type connector 22, with the body 20 of the mounting pad 10 having a generally round opening 32 therethrough for receiving a sensor transducer 14 mounted in the bayonet-type connector 22 to bring the transducer lens 15 into operative relationship with the reservoir. The bayonet-type connector 22 may take the form of a generally cylindrical boss (also 22) extending outwardly from the body 20 of the mounting pad 10, with a generally round or cylindrical through opening 32 extending through the bayonet-type connector 22 and the body 10 in generally concentric relationship with the connector 22.

Most preferably, the bayonet-type connector 22 comprises at least two generally arcuate bayonet-type locking ledges 34 along opposite sides of the through opening 32, and two notches 36 extending into the locking ledges 34 to receive bayonet-type, laterally-outwardly-extending locking tabs 38 of a generally cylindrical locking member 40. As used with respect to the locking member 40, the term "laterally outwardly" refers to the direction laterally outwardly with respect to the longitudinal axis of the locking member 40, i.e., the direction generally perpendicular to the longitudinal axis of the locking member 40. Two generally arcuate abutment ledges 42 are provided in the bayonet-type connector 22 generally inwardly of the locking ledges 34, with a first end 44 of the locking member 40 abutting the abutment ledges 42 when the locking tabs 38 are turned under the locking ledges 34 of the bayonet-type connector 22.

The abutment ledges 42 are preferably displaced radially with respect to the center of the through opening 32 relative to the locking ledges 34, with the gaps 46 between the abutment ledges 42 being radially aligned with the locking ledges 34. For example, in a connector 22 having two locking ledges 34, two tab-receiving notches 36 and two abutment ledges, each locking ledge 34 may extend through an arc of approximately 34°, each tab-receiving notch 36 may extend through an arc of approximately 31°, and each abutment ledge 42 may extend through an arc of approximately 115°, with the total arcs adding up to 360° without significant overlap. This arrangement facilitates use of the bayonet-type connector 22 with locking members 40 having relatively wide tolerances for the thickness and stiffness of the locking tabs 38.

Also, preferably, at least one detent bump 48 is provided along the inner side of at least one, but most preferably both, of the locking ledges 34 to resist rotation of the locking member 40 with respect to the bayonet-type connector 22 to prevent inadvertently disconnecting the locking member 40 from the mounting pad 10. The resiliency of the material of the mounting pad 10 allows the detent bumps 48 to be overcome when the locking member 40 is deliberately rotated to disconnect it.

The mounting pad 10, including the body 20, bayonet-type connector 22 and foot pads 24, is preferably integrally molded of a suitable thermoplastic material in one continuous piece. As used herein "integrally molded" or "integral" means molded or formed in one continuous piece, as opposed to more than one piece mechanically fastened together or glued together to form one assembly. A preferred thermoplastic material is the nylon material available under the trade designation "ZYTEL™ 101" from E. I. Du Pont de Nemours Company, Wilmington, Del.

Most preferably, as illustrated in FIG. 4, the body 20 of the mounting pad 10 is generally planar and generally square or rectangular. The body 20 has opposite edges 50 curving away from the plane of the body 20 to living hinges 52, as shown in FIGS. 1 and 2. For example, the opposite edges 50 may curve away from the plane of the body 20 toward the inward direction at an angle of approximately 45°. The generally cylindrical bayonet-type connector 22 extends outwardly from the body 20 of the mounting pad 10, as illustrated in FIGS. 1 and 2.

As illustrated in FIGS. 1 and 2, the foot pads 24 are pivotable along the living hinges 52 relative to the body 20 to allow the foot pads 24 to be pivoted to positions in which the mounting surface 28 of the foot pads 24 are not generally parallel with the body 20. Each living hinge 52 is generally elongate and is an integral molded portion of the mounting pad 10. The living hinges 52 extend substantially along the entire length of the opposite edges 50 of the body 20 of the mounting pad 10. The foot pads 24 are able to pivot, along the living hinges 52, relative to the body 20 of the mounting pad 10 to conform to the wall 12 of a reservoir 13 having a generally round horizontal cross section, as illustrated in FIG. 6, or to conform to reservoirs having other cross sections, such as generally square or rectangular cross sections. For example, each living hinge 52 may be formed by having the thickness of the body 20 taper down from a general overall thickness of approximately 0.06 inches (1.3 mm) of the body 20 to a thickness at the living hinge 52 of approximately 0.005 inches (0.11 mm).

Figure 8:
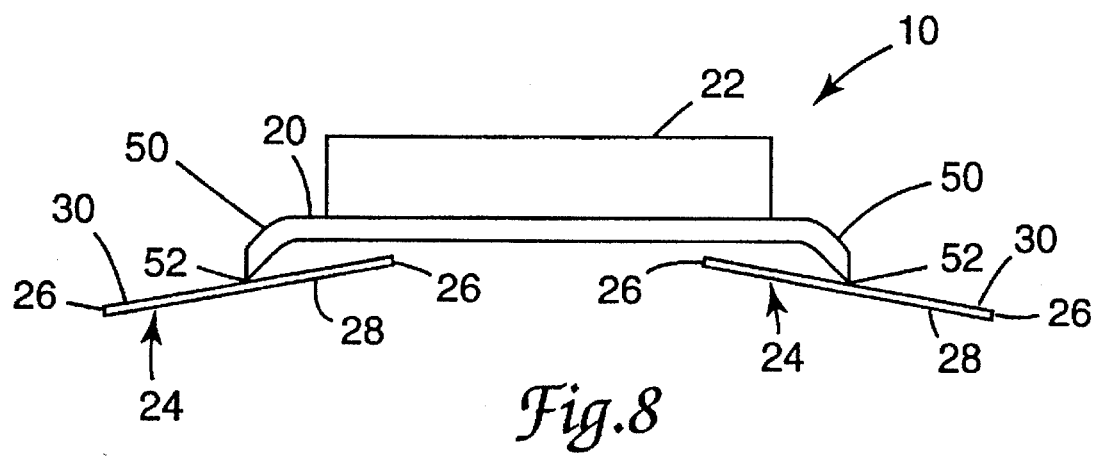
FIG. 8 is a side elevational view similar to FIGS. 1–2, illustrating foot pads biased toward a position inclining slightly toward the body of the mounting pad in the direction toward each other.

Preferably, each foot pad 24 is generally rectangular having a direction of elongation generally parallel with the other foot pad 24, as illustrated in FIGS. 3 and 4. The direction of elongation of the living hinge 52 for each foot pad 24 is generally along the direction of elongation of the foot pad 24. The arrangement is such that the foot pads 24 can be pivoted across the direction of the width relative to the body 20 of the mounting pad, as illustrated in FIGS. 1 and 2. As illustrated in FIG. 8, the foot pads 24 are generally biased toward a position inclining slightly toward the body 20 in the direction toward each other, thereby further tending to conform to a housing wall 12 of a reservoir 13 having a generally convex-curved outer wall surface.

The foot pads 24 are generally resiliently flexible sufficiently to allow the foot pads 24 to further conform to the configuration of the reservoir 13. As used herein, the term "flexible" refers to the ability of the foot pads 24 to bend or flex along their width or length, as opposed to the term "pivotable", which refers to the ability of the foot pads 24 to pivot along the living hinges 52 relative to the body 20. The foot pads 24 are generally thin relative to the thickness of the body 20, for example, to allow the foot pads 24 to be relatively flexible in comparison to the relative stiffness of the body 20 and bayonet-type connector 22. For example, the body 20 may have a thickness of approximately 0.06 inches (1.3 mm) and each foot pad 24 may have a thickness of approximately 0.015 inches (0.37 mm). The foot pads 24 are more flexible across their width than across their length due to the elongate living hinges 52 extending along the length of the foot pads 24.

Also, preferably, each foot pad 24 has a generally concave, rounded edge portion 54 generally adjacent the opening 32 through the body 20 of the mounting pad 10. The rounded edge portions 54 allow the bayonet-type connector 22 and opening 32 to use a greater amount of the width of the mounting pad 10 than would be the case without such rounded edge portions 54. The rounded edge portions 54 prevent the foot pads 24 and transducer 14 from interfering with each other, while allowing relatively close spacing of the foot pads 24 from one another. In addition, the rounded edge portions 54 increase the flexibility of the foot pads 24 in the longitudinal and lateral directions of the foot pads 24.

V-shaped notches 56 may also be provided in the foot pads 24 to increase flexibility of the foot pads 24 in their longitudinal direction, as well as in their lateral direction. For example, one generally V-shaped notch 56 may be provided along the laterally outwardly edge generally along the center of its length. As used herein with respect to the mounting pad 10, the term "laterally outwardly" refers to the direction across the width of the foot pads 24 away from the body 20 of the mounting pad 10. The "laterally outwardly" direction is toward either the right or left of the mounting pad 10 in FIGS. 1–4, which direction is generally perpendicular to the "inner" and "outer" directions defined above.

Most preferably, the adhesive coating 28 on the mounting surface (also 28) of the foot pads 24 is provided by the acrylate pressure sensitive adhesive available under the trade designation "SCOTCH™ VHB™ Very High Bond Joining Systems" from Minnesota Mining and Manufacturing Company, St. Paul, Minn. A conventional release liner 58 (FIG. 1) is affixed to the mounting surface 28 of each foot pad 24 to cover the adhesive coating 28 before use of the mounting pad 10.

As illustrated in FIG. 6, the locking member 40 is generally cylindrical, and has a generally cylindrical internal cavity 60 for receiving the ultrasonic transducer 14 of the level sensor. The internal cavity 60 has an open end through the first end 44 of the locking member 40, through which the transducer lens of the transducer 14 extends into operative relationship, e.g., contact, with the wall 12 of the reservoir 13. A window 62 is provided through the wall of the locking member 40 to allow passage of the transducer 14 and cable 17 through the wall of the locking member 40. The locking member 40 is integrally molded of thermoplastic material, such as nylon or polycarbonate.

The locking tabs 38 of the locking member 40 are releasably lockable under the locking ledges 34 of the bayonet-type locking connector 22 on the body 20 of the mounting pad 10. When the locking tabs 38 are locked under the locking ledges 34, the open end of the internal cavity 60 of the locking member 40 is aligned with the opening 32 through the body 20 so that a transducer lens of the ultrasonic transducer 14 received in the cavity of the locking member 40 can also be received through the opening 32 in the body 20.

A coil spring 64 is provided within the locking member 40 for biasing the ultrasonic transducer 14 in the direction along the longitudinal axis of the internal cavity 60 of the locking member 40 toward the first end 44 of the locking member 40. This is the direction in use of the transducer 14 and locking member 40 toward the housing wall 12 of the reservoir 13 to bring the transducer lens 15 into operative relationship with the reservoir 13. A boss (not shown) is provided within the internal cavity 60 of the locking member 40 extending longitudinally within the internal cavity 60 for a short distance from the outside end 66 of the locking member 40. The coil spring 64 is received on the boss to help retain the coil spring 64 and the transducer 14 within the internal cavity 60 of the locking member 40.

The coil spring 64 exerts a force against the wall 12 of the reservoir 13, thus resulting in an outwardly directed force being applied to the foot pads 24 via the locking member 40, bayonet-type connector 22, body 20 and living hinges 52. Such an outwardly directed force tends to want to separate the foot pads 24 from the wall 12 of the reservoir 13. However, since that force is transmitted to the foot pads 24 intermediate the edges 26 of the foot pads 24, the adhesive coating 28 on the foot pads 24 is better able to resist the force than would be the case if the force was transmitted directly along an edge of the foot pads. The same holds true for other forces that are transmitted through the transducer 14, locking member 40 or transducer cable 17, for example, forces resulting from the weight of the transducer 14 and cable 17 and forces resulting from jostling the cable 17 or transducer 14.

IN OPERATION:

The mounting pads 10 may be packaged in pairs, with one being used to mount a transducer 14 that triggers an alarm, resulting in the blood pump being stopped, and the other used to mount a transducer 14 that triggers an alert, resulting in a warning being provided to the perfusionist. The mounting pads 10 could alternatively be used singly to trigger either an alert or alarm as desired.

In order to use the mounting pads 10, the release liner 58 is first removed from the foot pads 24 to expose the adhesive coating 28. The foot pads 24 are then pressed against the housing wall 12 of the reservoir 13, while allowing the foot pads 24 to pivot relative to the body 20 to conform to the configuration of the housing wall 12 of the reservoir 13. Most preferably, the foot pads 24 are pivoted relative to the body 20 of the mounting pad 10, as illustrated in FIG. 2, immediately before pressing the foot pads 24 against the housing wall 12 of the reservoir 13. The foot pads 24 are then allowed to pivot relative to the body 20 to conform to the configuration of the housing wall 12 of the reservoir 13. The resilience of the foot pads 24 also allow the foot pads 24 to flex to further conform to the configuration of the housing wall 12.

Gel would normally be applied to the housing wall 12 through the opening 32 of the mounting pad 10 and/or on the transducer lens. Alternatively, a coil spring 64 and transducer lens could be selected to allow for use of the transducer 14 without the gel.

After the mounting pad 10 is affixed to the wall 12 of the reservoir 13, the locking member 40 is pressed against the bayonet locking connector 22 of the mounting pad 10 and the locking member 40 is twisted to engage the locking tabs 38 of the locking member 40 under the locking ledges 34 of the bayonet-type locking connector 22. This brings the transducer lens of the ultrasonic transducer 14, which is received in the internal cavity 60 of the locking member 40, through the opening 32 in the body 20 of the mounting pad 10, and into operative relationship with the reservoir 13. Alternatively, the locking member 40 could be connected to the mounting pad 10 before the mounting pad 10 is affixed to the wall 12 of the reservoir 13.

The coil spring 64 biases the ultrasonic transducer 14 relative to the locking member 40 and mounting pad 10 toward the housing wall 12 of the reservoir 13. This results in a outwardly directed force being applied to the foot pads 24 of the mounting pad 10 along the living hinges 52, which are intermediate the edges 26 of the foot pads 24. As a result, such forces are transmitted to the foot pads 24 intermediate the edges 26 of the foot pads 24 rather than directly to an edge 26 of the foot pads 24, thereby reducing creep and failure of the adhesive coating 28 in comparison with mounting pads in which force is transmitted to adhesive areas adjacent the edges of such adhesive areas. Other forces that would be transmitted via the body 20 and living hinges 52 to the foot pads 24 intermediate the edges 26 of the foot pads 24 include the weight of the transducer 14, locking member 40 and cable 17, and forces generated by jostling the cable 17.

It will be understood that, while the mounting pad 10 is described for use with an ultrasonic level sensor, the invention is not so limited. The mounting pad 10 can be used with any type of sensor or transducer incorporating complementary fastening elements, e.g., bayonet-type locking tabs, or held in a locking member having such fastening elements. Moreover, while the mounting pad 10 is described for use in cardiovascular perfusion apparatus, it could be applied outside this field, for example, in other medical and surgical fields, or outside the medical and surgical field.

As various changes could be made in the above constructions and methods without departing from the scope of the invention as defined in the claims, it is intended that all matter contained in the above description or shown in the accompanying drawing be interpreted as illustrative and not in a limiting sense.

We claim:

1. A mounting pad for mounting a sensor on a wall, the mounting pad comprising:
   a body;
   means on the body for mounting a sensor on the body of the mount; and
   at least two foot pads, each foot pad having an edges, a mounting surface having an adhesive coating, and an outer surface opposite the mounting surface, the outer surface being pivotably connected to the body intermediate the edges of the foot pad such that the foot pads can pivot relative to the body to conform to the configuration of the wall and such that any forces applied to the foot pads via the body of the mounting pad are applied intermediate the edges of the foot pads.

2. A mounting pad according to claim 1 wherein the means on the body for mounting a sensor on the body of the mounting pad comprises a bayonet-type connector, the body having an opening therethrough for receiving a sensor mounted in the bayonet-type connector.

3. A mounting pad according to claim 1 further comprising a release liner affixed to the mounting surface of each foot pad.

4. A mounting pad according to claim 1 wherein the body, means on the body for mounting the sensor on the body of the mounting pad and the foot pads are integrally molded, the foot pads being connected to the body by living hinges.

5. A mounting pad according to claim 4 wherein each foot pad is generally rectangular having a direction of elongation generally parallel with the other foot pad, the living hinge for each foot pad being generally elongate extending along the direction of elongation of the foot pad.

6. A mounting pad according to claim 5 wherein the body is generally planar and generally square or rectangular, the body having opposite edges curving away from the plane of the body to the living hinges, the foot pads being pivotable along the living hinges relative to the body to allow the foot pads to be pivoted to positions in which the mounting surface of the foot pads are not generally parallel with the body.

7. A mounting pad according to claim 6 wherein the body has an opening therethrough for receiving a sensor mounted in the means for mounting, each foot pad having a generally concave, rounded edge portion generally adjacent the opening through the body.

8. A mounting pad according to claim 7 wherein the foot pads are generally biased toward a position inclining slightly toward the body in the direction toward each other, thereby further tending to conform to a housing of a reservoir having a generally convex-curved surface.

9. A mounting pad according to claim 4 wherein the mounting pad is integrally molded of thermoplastic material.

10. A mounting pad according to claim 1 wherein the foot pads are generally resiliently flexible sufficiently to allow the foot pads to conform to the configuration of the wall.

11. A combination comprising:
    a blood reservoir, the blood reservoir having a rigid housing forming a chamber for holding blood therein;
    a level sensor for sensing whether the blood level is above or below the level of the sensor; and
    a mounting pad for mounting the level sensor on the housing of the blood reservoir, the mounting pad comprising:
    a body;
    at least two foot pads, each foot pad having edges, a mounting surface having an adhesive coating adhered to the housing of the blood reservoir, and an outer surface opposite the mounting surface, the outer surface of each foot pad being pivotably connected to the body intermediate the edges of the foot pad such that the foot pads can pivot relative to the body to conform to the configuration of the reservoir and such that any forces applied to the foot pads via the body of the mounting pad are applied intermediate the edges of the foot pads; and
    means on the body for mounting the sensor on the body of the mounting pad at a position relative to the reservoir allowing the sensor to sense whether the level of fluid in the chamber of the blood reservoir is above or below the level of the sensor.

12. A combination according to claim 11 wherein the housing of the reservoir has a generally round cross section, the foot pads being able to pivot relative to the body of the mounting pad to conform to the generally round cross section of the housing.

13. A combination according to claim 11 wherein the means on the body for mounting the sensor on the body of the mounting pad comprises a bayonet-type connector, the body of the mounting pad having an opening therethrough for receiving the sensor mounted in the bayonet-type connector.

14. A combination according to claim 13 wherein the sensor comprises an ultrasonic transducer having a transducer lens, the ultrasonic transducer of the sensor being mounted in the bayonet-type connector of the mounting pad to bring the transducer lens in operative relationship with the reservoir.

15. A combination according to claim 13 wherein the body, means on the body for mounting the sensor on the body of the mounting pad and the foot pads are integrally molded, the foot pads being connected to the body by living hinges.

16. A combination according to claim 15 wherein each foot pad is generally rectangular having a direction of elongation generally parallel with the other foot pad, the living hinge for each foot pad being generally elongate extending along the direction of elongation of the foot pad.

17. A combination according to claim 16 wherein the body of the mounting pad is generally planar and generally square or rectangular, the body having opposite edges curving away from the plane of the body to the living hinges, the foot pads being pivotable along the living hinges relative to the body to allow the foot pads to be pivoted to positions in which the mounting surface of the foot pads are not generally parallel with the body.

18. A combination according to claim 17 wherein the body of the mounting pad has an opening therethrough for receiving a sensor mounted in the means for mounting, each foot pad having a generally concave, rounded edge portion generally adjacent the opening through the body.

19. A combination according to claim 18 wherein the foot pads are generally biased toward a position inclining slightly toward the body in the direction toward each other, thereby further tending to conform to a housing of a reservoir having a generally convex-curved surface.

20. A combination according to claim 15 wherein the mounting pad is integrally molded of thermoplastic material.

21. A combination according to claim 11 wherein the foot pads are generally resiliently flexible sufficiently to allow the foot pads to conform to the configuration of the reservoir.

22. A combination according to claim 11 wherein the sensor comprises an ultrasonic transducer having a transducer lens.

23. A combination according to claim 22 further comprising a generally cylindrical locking member in which the ultrasonic transducer of the sensor is received, the ultrasonic transducer being spring biased within the locking member in the direction toward the housing of the reservoir to bring the transducer lens into operative relationship with the reservoir, the locking member including outwardly extending bayonet-type locking tabs releasably locking the locking member in the bayonet-type connector of the mounting pad.

24. A mechanism for mounting an ultrasonic transducer of a level sensor on a reservoir, the mechanism comprising:
    a locking member having:
        a first end;
        an internal cavity for receiving the ultrasonic transducer of the level sensor, the internal cavity having an open end through the first end of the locking member;
        outwardly extending locking tabs adjacent the first end of the locking member; and
        a spring within the locking member for biasing the ultrasonic transducer in the direction toward the first end; and
    a mounting pad for mounting the locking member relative to a housing of the reservoir, the mounting pad comprising:
        a body having an opening therethrough;
        a bayonet locking connector having ledges for locking the locking tabs of the locking member on the body of the mounting pad with the open end of the internal cavity of the locking member aligned with the opening through the body, whereby a transducer lens of the ultrasonic transducer received in the cavity of the locking member can also be received through the opening in the body; and
    at least two foot pads, each foot pad having edges, a mounting surface having an adhesive coating, and an outer surface opposite the mounting surface, the outer surface being pivotably connected to the body intermediate the edges of the foot pad such that the foot pads can pivot relative to the body to conform to the configuration of the reservoir and such that any forces applied to the foot pads via the body of the mounting pad are applied intermediate the edges of the foot pads.

25. A mechanism according to claim 24 further comprising a release liner affixed to the mounting surface of each foot pad.

26. A mechanism according to claim 24 wherein the mounting pad is integrally molded in a single continuous piece, the foot pads being integrally connected to the body of the mounting pad by living hinges.

27. A mechanism according to claim 26 wherein the mounting pad is integrally molded of thermoplastic material, and the locking member is generally cylindrical and integrally molded of thermoplastic material.

28. A mechanism according to claim 26 wherein the foot pads are generally resiliently flexible sufficiently to allow the foot pads to further conform to the configuration of the reservoir.

29. A mechanism according to claim 26 wherein each foot pad is generally rectangular having a direction of elongation generally parallel with the other foot pad, the living hinge for each foot pad being generally elongate extending along the direction of elongation of the foot pad.

30. A mechanism according to claim 29 wherein the body is generally planar and generally square or rectangular, the body having opposite edges curving away from the plane of the body to the living hinges, the foot pads being pivotable along the living hinges relative to the body to allow the foot pads to be pivoted to positions in which the mounting surface of the foot pads are not generally parallel with the body.

31. A mechanism according to claim 30 wherein each foot pad has a generally concave, rounded edge portion generally adjacent the opening through the body.

32. A mechanism according to claim 30 wherein the foot pads are generally biased toward a position inclining slightly toward the body in the direction toward each other, thereby further tending to conform to a housing of a reservoir having a generally convex-curved surface.

33. A method of mounting an ultrasonic transducer of a level sensor on a blood reservoir, the method comprising the following steps:
    providing a mounting pad comprising a body having an opening therethrough; a bayonet locking connector on the body; at least two foot pads, each foot pad having edges, a mounting surface having an adhesive coating, and an outer surface opposite the mounting surface, the outer surface being pivotably connected to the body intermediate the edges of the foot pad such that any forces applied to the foot pads via the body of the mounting pad are applied intermediate the edges of the foot pads, and a release liner over the adhesive coating on the mounting surface of the foot pads;
    removing the release liner from the foot pads to expose the adhesive coating;
    pressing the foot pads against a housing of the reservoir while allowing the foot pads to pivot relative to the body to conform to the configuration of the housing of the reservoir;

providing a locking member having a first end; an internal cavity receiving the ultrasonic transducer of the level sensor, the internal cavity having an open end through the first end of the locking member; and outwardly extending locking tabs adjacent first end of the locking member;

pressing the locking member against the bayonet locking connector of the mounting pad and twisting the locking member to engage the locking tabs of the locking member in the bayonet locking connector of the mounting pad thereby bringing a transducer lens of the ultrasonic transducer through the opening in the body of the mounting pad and into operative relationship with the reservoir; and applying forces to the body of the mounting pad, with said forces being transmitted to the foot pads intermediate the edges of the foot pads rather than directly to an edge of the foot pads.

34. A method according to claim 33 wherein the foot pads are resiliently flexible, the step of pressing the foot pads against a housing of the reservoir while allowing the foot pads to pivot relative to the body to conform to the configuration of the housing of the reservoir further comprising:

flexing the foot pads to further conform to the configuration of the housing.

35. A method according to claim 33 further comprising the step of spring biasing the ultrasonic transducer relative to the locking member toward the housing of the reservoir.

36. A method according to claim 33 further comprising pivoting the foot pads relative to the body of the mounting pad immediately before the step of pressing the foot pads against a housing of the reservoir while allowing the foot pads to pivot relative to the body to conform to the configuration of the housing of the reservoir.

* * * * *